United States Patent [19]
Komine

[11] Patent Number: 5,640,480
[45] Date of Patent: Jun. 17, 1997

[54] ZIG-ZAG QUASI-PHASE-MATCHED WAVELENGTH CONVERTER APPARATUS

[75] Inventor: Hiroshi Komine, Torrance, Calif.

[73] Assignee: Northrop Grumman Corporation, Los Angeles, Calif.

[21] Appl. No.: 512,053

[22] Filed: Aug. 7, 1995

[51] Int. Cl.⁶ .................................................. G02F 1/39
[52] U.S. Cl. ........................ 385/122; 359/330; 359/332
[58] Field of Search .................. 385/122; 359/326–332; 372/21, 22

[56] References Cited

U.S. PATENT DOCUMENTS

| | | | |
|---|---|---|---|
| 3,832,567 | 8/1974 | Jacques et al. | 359/276 |
| 4,865,406 | 9/1989 | Khanarian et al. | 385/122 |
| 4,893,888 | 1/1990 | Okazaki et al. | 385/14 |
| 4,907,850 | 3/1990 | Araki et al. | 385/1 |
| 4,955,977 | 9/1990 | Dao et al. | 385/130 |
| 4,971,416 | 11/1990 | Khanarian et al. | 359/328 |
| 4,997,244 | 3/1991 | Nishio et al. | 359/328 |
| 5,006,729 | 4/1991 | Meijer et al. | 359/328 |
| 5,028,109 | 7/1991 | Lawandy | 359/328 |
| 5,049,762 | 9/1991 | Katoh | 359/332 |
| 5,052,780 | 10/1991 | Klein | 359/638 |
| 5,058,970 | 10/1991 | Schildkraut et al. | 359/328 |
| 5,073,725 | 12/1991 | Takano et al. | 359/328 |
| 5,113,469 | 5/1992 | Hatakoshi et al. | 385/122 |
| 5,150,446 | 9/1992 | Penner et al. | 385/122 |
| 5,151,965 | 9/1992 | Rikken et al. | 385/122 |
| 5,167,000 | 11/1992 | Minemoto et al. | 385/122 |
| 5,181,223 | 1/1993 | Baer | 372/69 |
| 5,274,495 | 12/1993 | Shirasaki | 359/330 |
| 5,305,345 | 4/1994 | Albrecht et al. | 372/69 |

*Primary Examiner*—John D. Lee
*Attorney, Agent, or Firm*—Terry J. Anderson; Karl J. Hoch, Jr.

[57] ABSTRACT

An optical wavelength converter apparatus that employs quasi-phase-matched parametric interaction or sum/harmonic frequency generation of electromagnetic radiation within a slab of optical material. The optical wavelength converter apparatus uses a zig-zag electromagnetic beam path in an optically flat and parallel slab on which total internal reflection from upper and lower surfaces provides a phase shift for phase matching for each leg of the zig-zag path.

9 Claims, 4 Drawing Sheets

ZIG-ZAG QUASI-PHASE-MATCHED WAVELENGTH CONVERTER APPARATUS

BACKGROUND OF THE INVENTION

1. Field of the Invention

The present invention relates to nonlinear optical devices for converting laser radiation wavelength by means of quasi-phase-matched, parametric interaction or sum/harmonic frequency generation. More particularly, the invention uses a zig-zag beam path in an optically flat and parallel slab, in which each total internal reflection provides the necessary phase shift to accomplish phase matching for each leg of the zig-zag path.

2. Description of the Background Art

Quasi-phase-matching (QPM) is a known technique for realizing efficient generation of radiation from coherently interacting waves in a nonlinear optical medium that lack birefringence. Prior structures for achieving quasi-phase matching involves optical devices including a series of two alternating optical layers. In one class of approaches, the phase mismatch in each layer is set to an odd multiple of $\pi$ radians, while the sign of the nonlinear coefficient reverses in alternating layers. The sign reversal is equivalent to an additional phase shift of $\pi$ radians. These two conditions are required to maximize power conversion in each layer and to achieve cumulative growth in successive layers. This approach is used in periodically poled lithium niobate crystal fibers, stacks of discrete plates at Brewster angle, and diffusion-bonded plates. Other approaches use a non-interacting material for the second layer that simply provides phase shifts needed to reach a combined phase mismatch of an integral multiple of $2\pi$. Examples of this approach include periodically structured waveguides.

Representative art in wavelength conversion technology include the following references:

Minemoto et al. U.S. Pat. No. 5,167,000 issued Nov. 24, 1992 entitled OPTICAL WAVELENGTH CONVERTER discloses a nonlinear optical device which uses non-linear optical materials that transmit a fundamental wave and generated higher harmonics, and have optical absorption maximums based on an electronic transition between wavelengths of the fundamental wave and the generated higher harmonics. By emitting higher harmonics having a wavelength within an optical transmission region between wavelengths of the two optical absorption maximums, a device with high conversion efficiency can be realized.

Katoh U.S. Pat. No. 5,049,762, issued Sep. 17, 1991 entitled OPTICAL WAVELENGTH CONVERTER SYSTEM discloses an optical wavelength converter system that includes a light source for emitting a fundamental wave, a fiber or optical waveguide type optical wavelength converter device for converting the wavelength of the fundamental wave and emitting a wavelength converted wave, and an optical system for introducing said fundamental wave into the optical wavelength converter device. The optical wavelength converter device includes an element made of an organic nonlinear optical material and covered with a cladding layer which has a smaller refractive index that the refractive index of said element.

Nishio et al U.S. Pat. No. 4,997,244 issued Mar. 5, 1991 entitled OPTICAL WAVELENGTH CONVERTING DEVICE AND MANUFACTURING METHOD THEREOF discloses an optical wavelength converting device that includes a substrate, and a waveguide layer of nonlinear organic material formed on one major surface of the substrate and having a thickness tapered along one axis parallel to the major surface, in which a waveguide with a desired thickness can be selected in a direction normal to the axis.

Okazaki et al. U.S. Pat. No. 4,893,888 issued Jan. 16, 1990 entitled OPTICAL WAVELENGTH CONVERTER DEVICE discloses an optical wavelength converter device that has a waveguide of a nonlinear optical material disposed in cladding and having a refractive index lower than the refractive index of the cladding for converting a fundamental guided through the waveguide into a second or third harmonic and radiating the second or third harmonic into the cladding. The nonlinear optical material comprises an organic nonlinear optical material having a maximum light absorption coefficient at a wavelength close to the wavelength of at least one of the fundamental and the second harmonic.

Jacques et al U.S. Pat. No. 3,832,567 issued Aug. 27, 1974 entitled, TRAVELLING WAVE FREQUENCY CONVERTER ARRANGEMENT relates to travelling wave frequency converter arrangements based on the harmonic generation. The converter in accordance with the invention comprises a harmonic generation interface obtained by bringing together a metal film and an optical waveguide layer whose thickness is such that the phase velocities of the fundamental and harmonic frequency radiations transmitted are substantially matched with one another. Optical coupling means are associated with the optical waveguide and electrical means may be provided for altering the phase velocity matching.

Representation art in harmonic generating technology include the following references:

Penner et al. U.S. Pat. No. 5,150,446 issued Sep. 22, 1992 entitled CONVERSION EFFICIENCY SECOND HARMONIC GENERATOR discloses an optical article comprised of a support including a portion adjacent one major surface which is transparent to the electromagnetic radiation sought to be propagated, an organic layer unit capable of converting a portion of polarized electromagnetic radiation of a selected wavelength to its second harmonic wavelength, means for optically coupling into said organic layer unit polarized electromagnetic radiation of a selected wavelength in its zero order transverse magnetic mode, and means for receiving from the layer unit a portion of the electromagnetic radiation in the form of a first order transverse magnetic mode.

Takano et al. U.S. Pat. No. 5,073,725 issued Dec. 17, 1991 entitled OPTICAL HARMONIC GENERATOR discloses an apparatus wherein a metal surface plasmon is excited in a multilayered film composed of thin metal films and a thin dielectric film, by light having a propagation constant larger than that of the incident light emitted from an optical component such as a prism. Due to an extremely strong alternating electric field produced by the electric field enhancement effect of the metal surface plasmon, a harmonic is generated from a nonlinear optical crystal.

Schildkraut et al. U.S. Pat. No. 5,058,970 issued Oct. 22, 1991 entitled QUASI-PHASE MATCHING OPTICAL WAVEGUIDE discloses a quasi-phase matching optical waveguide for producing a second harmonic of an internally propagated polarized laser beam. The waveguide is comprised of at least one array of laterally spaced transparent electrodes in direct contact with a transmission medium containing similarly polar aligned organic molecular dipoles in overlying areas. The transparent electrodes and overlying areas of the transmission medium are each of the same width and spacing.

Khanarian et al. U.S. Pat. No. 4,971,416 issued Nov. 20, 1990 entitled POLYMERIC WAVEGUIDE DEVICE FOR PHASE MATCHED SECOND HARMONIC GENERATION discloses a parametric frequency converting device which comprises a thin film of a polymeric medium which exhibits second order nonlinear optical response, and the device has heat control means for temperature tuning of the waveguide medium to phase match the propagation constants of fundamental and second harmonic light beams. In a preferred device the waveguiding medium has a spatial quasi structure for quasi-phase matching of the propagating wave energy, and optionally has a set of electrodes for application of a direct current electric field to the waveguiding medium.

Araki et al U.S. Pat. No. 4,907,850 issued Mar. 13, 1990 entitled APPARATUS FOR PERIODICALLY GENERATING SECOND HARMONIC discloses an apparatus for periodically generating a second harmonic light comprises: a light source; and means for converting a fundamental wavelength light emitted from said light source to a second harmonic light, including optical wave guide means having a light propagation area and means for periodically varying a refractive index of the light propagation area.

References that disclose waveguides that provide frequency doubling include:

Rikken et al. U.S. Pat. No. 5,151,965; Lawandy U.S. Pat. No. 5,028,109; Meijer et al. U.S. Pat. No. 5,006,729; and Khanarian et al. U.S. Pat. No. 4,865,406.

SUMMARY OF THE INVENTION

An object of the present invention is to provide an optical wavelength converter apparatus that uses a zig-zag electromagnetic beam path.

Another object of the present invention is to provide an optical wavelength converter apparatus that employs quasi-phase-matched parametric interaction or sum/harmonic frequency generation of electromagnetic signals.

A further object of the present invention is to provide an optical wavelength converter apparatus that uses a zig-zag electromagnetic beam path in an optically flat and parallel slab on which total internal reflection provides a phase shift for phase matching for each leg of the zig-zag path.

Other and further features, advantages and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention and, together with the description, serve to explain the principles of the invention in general terms. Like numerals refer to like parts throughout the disclosure.

DETAILED DESCRIPTION OF PREFERRED EMBODIMENTS

Embodiments of nonlinear optical devices are described for converting laser radiation wavelength by means of quasi-phase-matched, parametric interaction or sum/harmonic frequency generation in an optically flat and parallel slab that is fabricated from a single plate or a stack of plates of a suitable material. Specifically, the device geometry uses a zig-zag beam path in the slab, in which each total internal reflection provides the necessary phase shift to accomplish phase matching for each leg of the zig-zag path. Quasi-phase matching is a concept for realizing efficient generation of radiation from coherently interacting waves in a nonlinear optical medium that lacks birefringence.

Figure 1:
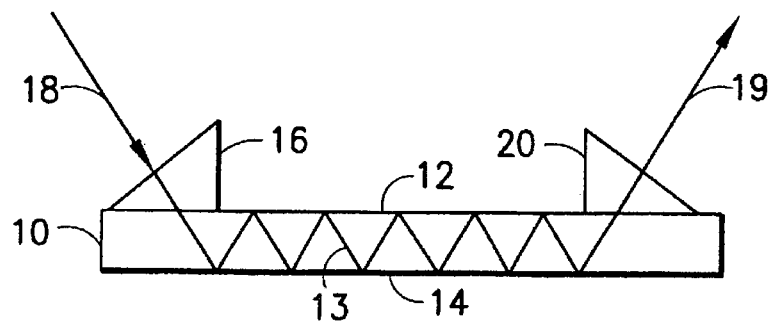
FIG. 1 is a schematic illustration of a zig-zag beam path within a parallel plate.

The zig-zag beam path in the present invention employs an optically flat and parallel slab with coupling optics at each end. In one embodiment, the slab is a single plate. Referring to FIG. 1, a schematic diagram of the structure for a single plate embodiment is shown. An input coupling optical element allows a laser beam to enter the plate at an internal angle for which total internal reflection (TIR) occurs at each bounce as the beam propagates within the plate. An output coupling optical element allows the beam to exit the plate.

More particularly, the slab 10 has an upper surface 12 that is parallel to a lower surface 14. An input coupling optical element 16 such as a prism allows a laser beam 18 to enter slab 10 at an internal angle for which the total internal reflection (TIR) occurs at each bounce from surfaces 12 and 14 as beam 18 propagates within slab 10 in a zig-zag path 13.

An output coupling optical element 20 such as a prism allows the zig-zag beam paths 13 to exit from slab 10 as output beam 19.

Slab 10 can also be fabricated from a stack of several plates that are contacted together with sufficiently low losses at the interfaces. The single plate case is described first to present the basic concept of the invention, followed by a description of multiple plate embodiments. A conceptual design of a device based on this invention is presented.

Wavelength conversion processes in slab 10 include second harmonic generation, sum and difference frequency generation, and parametric conversion. Second harmonic generation is the simplest case in which the input beam 18 at the fundamental frequency generates radiation at twice the frequency along the zig-zag path 13. When the fundamental and the second harmonic waves satisfy the quasi-phasematching condition along this path, the generated wave intensity increases with the number of TIR bounces. Output beam 19 consists of the second harmonic radiation and the residual unconverted fundamental radiation.

Figure 2:
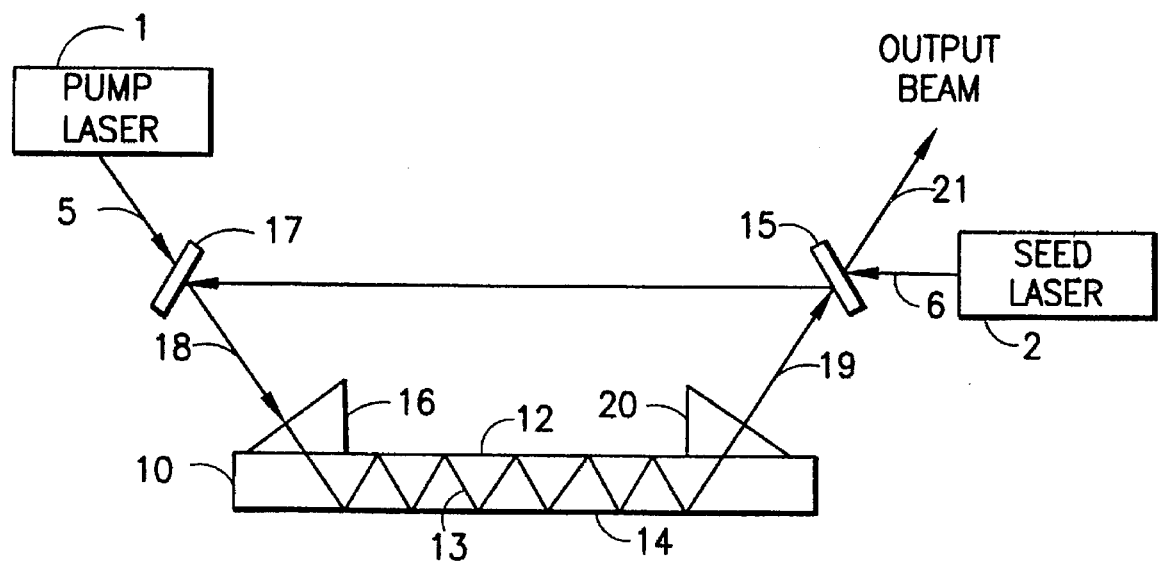
FIG. 2 is a schematic illustration of an embodiment of a parametric wavelength converter using quasi-phase matched nonlinear optical interaction along a zig-zag beam path within a parallel plate.

Parametric conversion devices based on this invention include optical parametric oscillator (OPO) and amplifier (OPA). Referring to FIG. 2, a schematic diagram of an OPO apparatus is shown. Laser 1 provides a high-power pump beam 5 at the pump frequency $\omega_3$. Laser 2 provides a low-power seed beam 6 at the signal frequency $\omega_2$. The OPO resonator consists of a partially reflective and transmissive mirror 15 at the signal wavelength and a dichroic beam combining mirror 17 which reflects at the signal wavelength but transmits at the pump wavelength. Pump beam 5 enters the resonator through mirror 17, while seed beam 6 enters the resonator through mirror 15 and reflects off of mirror 17 such that both pump and seed beams are colinearly overlapped to form a single input beam 18. Parametric interaction in slab 10 amplifies the signal seed radiation and generates idler radiation at frequency $\omega_1$, such that the sum of the signal and idler frequencies equals the pump frequency (i.e., $\omega_1+\omega_2=\omega_3$). When the parametric interaction is quasi-phase-matched along zig-zag path 13, both signal and idler radiation intensities grow with the number of TIR bounces as the pump radiation power is converted into the signal and idler waves. Thus, output beam 19 consists of the amplified signal and generated idler radiation and the residual unconverted pump radiation. Mirror 15 transmits part of the output beam 19 as OPO output 21 and reflects the remainder along the seed beam path. The reflected beam provides feedback to build up signal wave intensity in the resonator for efficient conversion.

Although the OPO in FIG. 2 oscillates with initial seed radiation from an external laser, oscillation can also be started from vacuum photons in the cavity, as is customarily done in free-running OPO devices. In contrast, for a relatively large signal input and sufficient parametric gain in slab 10, mirror 15 may be removed to construct an amplifier (i.e., OPA device), in which efficient conversion of pump power into signal power occurs in one pass through slab 10.

The following description of the invention is for the case of parametric interaction of three waves, signal, idler and pump waves, (i.e., amplification of the signal and idler waves by a pump wave); however, the extension of the concept to sum, difference, or harmonic frequency generation is straightforward.

Parametric interaction of waves in slab 10 along the zig-zag path accumulates a phase mismatch due to the dispersion of the material. The phase mismatch, $\Delta kL$, is given by an expression below:

$$\Delta kL=(k_3-k_2-k_1)L$$

L is the length of each zig-zag leg that depends on the plate thickness and the angle of incidence at which the wave enters slab 10; $k_3$, $k_2$, $k_1$ denote wave vectors for pump, signal, and idler waves, respectively. The coherence length, $L_c=\pi/\Delta k$, defines a characteristic interaction length over which power flows from the pump radiation to the signal/idler radiation, or vice versa.

A significant feature of the present invention is the use of the phase shift of TIR to compensate for the phase mismatch $\Delta kL$ for each leg of the zig-zag path. A key parameter is the "net TIR phase shift", $\Delta\phi$, which is the difference of the TIR phase shift between the pump wave and the sum of TIR phase shifts for the signal and idler waves:

$$\Delta\phi=\phi 3-\phi 2-\phi 1$$

Figure 3A:
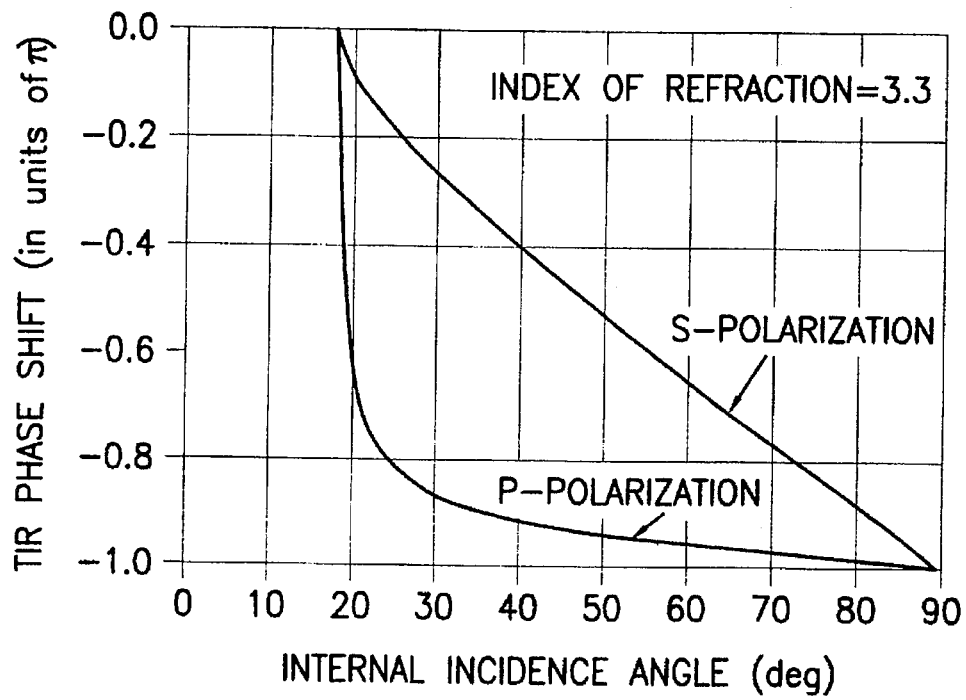
FIG. 3a is a diagram of the TIR phase shift vs. angle for an electromagnetic wave within a slab of gallium arsenide material.
Figure 3B:
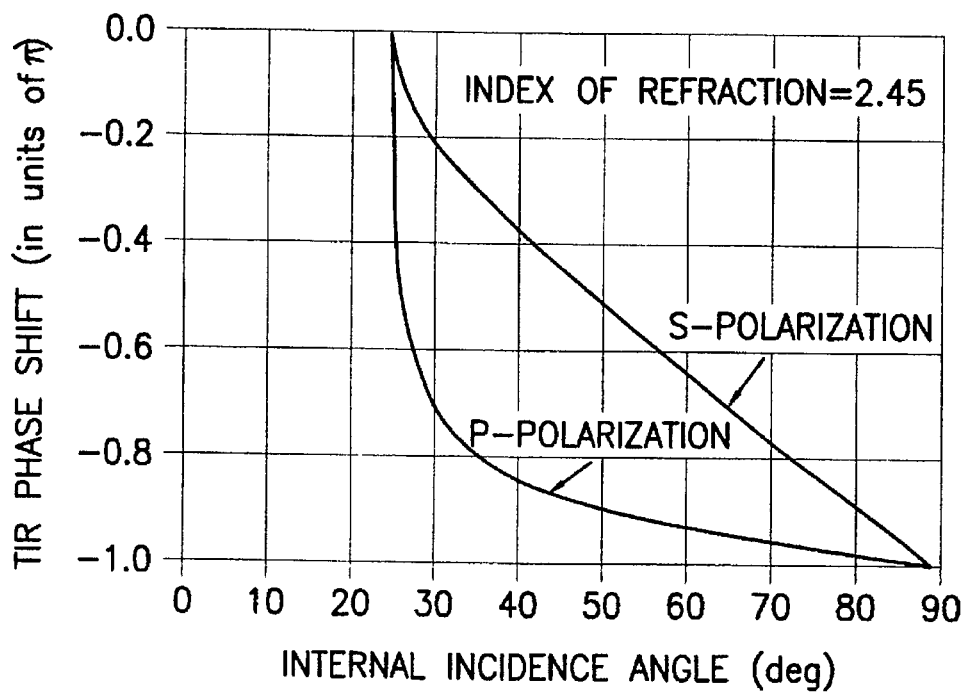
FIG. 3b is a diagram of the TIR phase shift vs. angle for an electromagnetic wave within a slab of zinc selenide material.

The individual phase shifts for the respective waves ($\phi 3$, $\phi 2$, $\phi 1$) can be calculated from electromagnetic wave equations describing TIR (i.e., Fresnel equations). FIGS. 3a and 3b show examples of calculated TIR phase shift in gallium arsenide (refractive index=3.3) and zinc selenide (refractive index=2.45), respectively, for both p- and s-polarization directions. These curves show that, in general, certain polarization combinations provide a net phase shift of zero or a value close to $\pi$.

Based on these calculations, two methods are provided to implement the present invention. One method is a geometrically unique way of implementing the conventional quasi-phase-matching approach. The other method is a novel type of quasi-phase-matching in which the TIR phase shifts compensate for dispersive phase mismatches without the sign reversal of the nonlinear coefficient, d. In both cases TIR phase shifts are essential for achieving the quasi-phase-matching (QPM) conditions. Therefore, the present invention will be referred to as TIR-QPM. The two methods are denoted by type-I and type II TIR-QPM.

The first method, referred to as "TIR-QPM with sign reversal of d coefficient (Type-I TIR-QPM) uses a certain zig-zag beam propagation directions in a plate and a combination of different phase shifts for p-polarized and s-polarized beams to produce a zero net TIR phase shift on total reflection among the interacting waves. In this case, the beam propagates at two different angles relative to the crystal axes for each leg of the zig-zag pair such that the nonlinear interaction coefficient in each leg has the opposite sign.

For this case, the phase-matching requirement is $$\Delta kL+\Delta\phi=(2m-1)\pi$$

where m is an integer. This condition must be satisfied by choosing an angle of incidence that yields a proper value for L and $\Delta\phi$ for a given set of wavelengths. Hence, angular variation provides a means for wavelength tuning.

Figure 4:
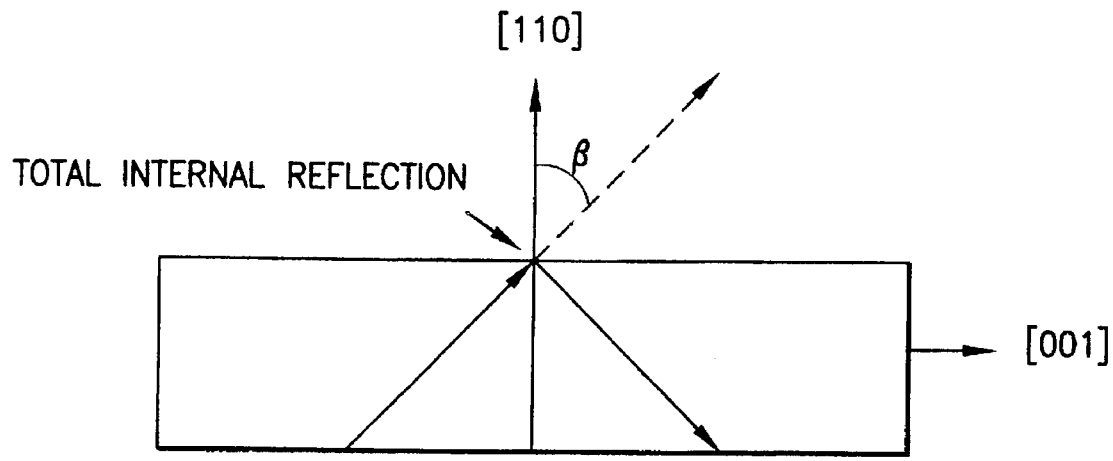
FIG. 4 is a schematic illustration of plate orientation of a type I TIR-QPM configuration with alternating signs of nonlinear interaction in successive zig-zag paths for a crystal with cubic symmetry.

FIG. 4 shows a schematic diagram of type I TIR-QPM configuration for crystals with cubic symmetry (43 m). In this example, the plate normal lies along the [110] direction of the crystal; other crystal orientations are also possible. Each zig-zag path reflects off of the internal face of the parallel plate at an angle $\beta$ relative to the [110] axis. The pump wave is p-polarized and the signal and idler waves are s-polarized. The net TIR phase shift upon reflection is zero when the angle of incidence is near 45°. In this geometry, the sign of the nonlinear polarization alternates for each leg. Thus, QPM can be realized if the length of each leg is chosen to be an odd multiple of the coherence length.

The second method referred as "TIR-QPM without sign reversal of d coefficient (Type II TIR-QPM)" achieves quasi-phase matching by compensating for phase mismatch in each leg by a net TIR phase shift upon each reflection. The zig-zag angle is chosen such that the combination of the dispersive phase mismatch and the net TIR phase shift yields $$\Delta kL+\Delta\phi=(2m)\pi$$

where m is an integer. This condition allows the cumulative growth of signal and idler waves.

A key idea of this method is to choose a combination of polarization directions (i.e., p and s polarization) and beam propagation angles to achieve a net TIR phase shift approaching $\pi$. The length of the zig-zag is selected to yield a phase mismatch such that the additional phase shift due to TIR produces the desired sum. An example of allowed polarization combinations consists of an s-polarized pump (wave 3) and signal (wave 2) and a p-polarized idler (wave 1). This combination may be denoted by "s3-s2-p1". Using this notation, "s3-p2-s1" and "p3-p2-p1" are also allowed combinations.

Figure 5:
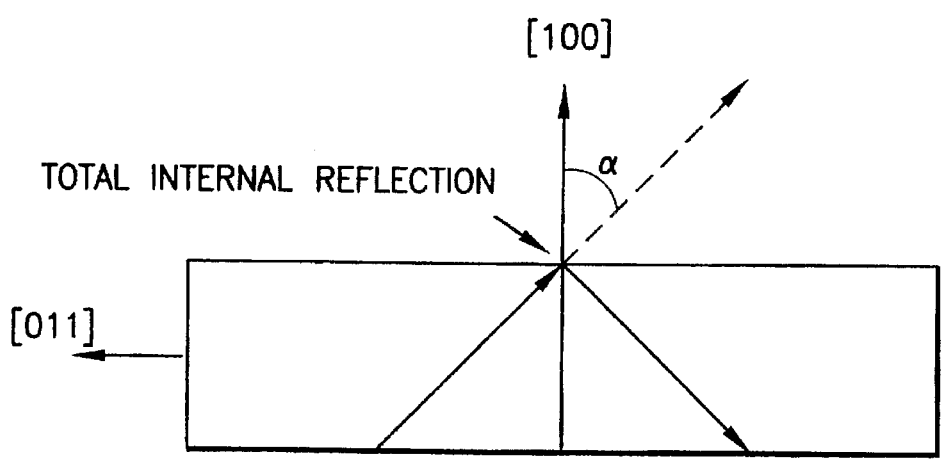
FIG. 5 is a schematic illustration of plate orientation of a type II TIR-QPM configuration without sign reversals of nonlinear interaction in successive zig-zag paths for a crystal with cubic symmetry.

In the case of "p3-p2-p1" combination, FIG. 5 shows a schematic diagram of plate orientation for a crystal with cubic symmetry (43 m). The plate normal in this case is oriented along the [001] direction. Unlike the type I TIR-QPM case, the polarization directions of the three waves are such that the sign of the nonlinear interaction is unchanged upon reflection in this type II TIR-QPM. Other crystal orientations with this property are also possible.

Other polarization combinations are "s3-s2-s1", "p3-p2-s1", "p3-s2-p1", and "s3-p2-p1". According to curves FIG. 2 and 3, these cases yield different net TIR phase shifts than those in the above cases. Thus, phase mismatch for the latter cases must be selected differently to satisfy the proper combined phase shift requirement.

Wavelength tuning can be accomplished by changing the incidence angle or pump wavelength. The net TIR phase shift and the zig-zag leg length vary with angle. Since coherence length changes with different wavelengths involved in the nonlinear interaction, a given value of net TIR phase shift selects a certain set of wavelengths for quasi-phase matching. For a fixed pump wavelength, a different set of signal and idler wavelengths satisfies the quasi-phase matching condition as the zig-zag length is varied with angle. Alternatively, the pump wavelength can be varied to tune the signal and idler wavelengths at a fixed incidence angle.

The beam width in the zig-zag plane has a maximum allowed value which is approximately one-third of the plate thickness for gaussian beams. This condition is required to minimize clipping losses at the wings of the beam upon entry and exit. The extent of the beam size in the lateral direction perpendicular to the beam width direction is only limited by the width of the slab. Thus, one way to increase beam energy is to use a beam with an elliptical shape.

The beam intensity needed to obtain efficient conversion is calculated from equations describing parametric interaction. This analysis shows that the QPM parametric gain is proportional to a product of effective nonlinear coefficient, coherence length, pump intensity, and the number of interaction segments traversed by the zig-zag beam path. Typically, a gain value greater than unity is needed to operate an efficient OPO device. Thus, once the nonlinear coefficient and coherence length are determined for a given material, the pump intensity and the number of segments must be selected to obtain the required gain value. The selection of these parameters are constrained by other factors. An upper bound for the number of interaction segments is set by an angular acceptance bandwidth for zig-zag TIR-QPM. This bandwidth requirement arises from phase mismatches due to variations in the angle of incidence within a beam with a certain divergence.

The basic concept of zig-zag TIR-QPM in a single plate as shown in FIG. 1 can be extended to a stack of two or more plates. Although one or more contacting procedures would be needed to fabricate such a stack, one benefit of the stack is that it can provide the desired parametric gain value with a greater tolerance for beam divergence. In practice, the choice between a single plate or multiple plates can be determined by design analysis.

Figure 6:
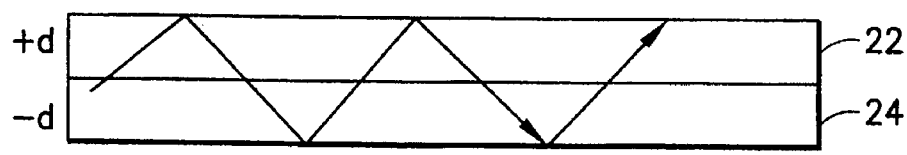
FIG. 6 is a schematic illustration of two TIR-QPM plates joined together on one face.

The simplest case of multiple plates consists of two TIR-QPM plates 22 and 24 joined together on one face. FIG. 6 shows a schematic diagram for this embodiment. The bottom plate 24 is oriented in the opposite sense relative to the top plate 22 such that the effective nonlinear coefficient reverses sign as the beam crosses the interface each time. This sign reversal is required for cumulative growth of the generated radiation because beam propagation through the interface does not provide any phase shift.

The two-plate geometry shown in FIG. 6 doubles the allowed beam size for propagating through the slab in a zig-zag path. For a diffraction-limited beam, the beam divergence is inversely proportional to the beam size; thus, doubling the beam width halves the beam divergence. The smaller beam divergence permits a greater number of interaction segments within the angular acceptance bandwidth constraint, thereby increasing the parametric gain in this geometry.

Figure 7:
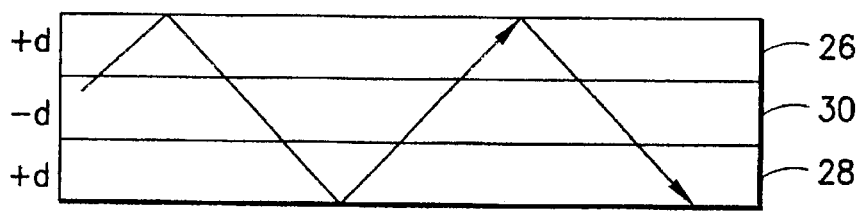
FIG. 7 is a schematic illustration of a three TIR-QPM plate structure.

The extension of this idea to an embodiment having three plates is schematically shown in FIG. 7. The top and bottom plates 26 and 28 are fabricated according to the TIR-QPM requirements. The middle plate 30 is a QPM plate with a thickness that yields an interaction segment length which is an odd multiple of coherence length. In general, the thickness of this interior plate is independent of those for the exterior TIR plates. The orientation of the plates must be such that the effective nonlinear coefficient reverses sign at each interior interface. A benefit of this structure is that a beam width that is three times that for a single plate can be used to increase the parametric gain correspondingly while satisfying the angular acceptance bandwidth constraint. Embodiments with more than three plates, that is, additional interior QPM plates with proper orientations can increase the parametric gain accordingly. However, in practice, this benefit must be balanced by a potentially decreasing probability of making good plate contacts at each interface with very low losses and defects.

Figure 8:
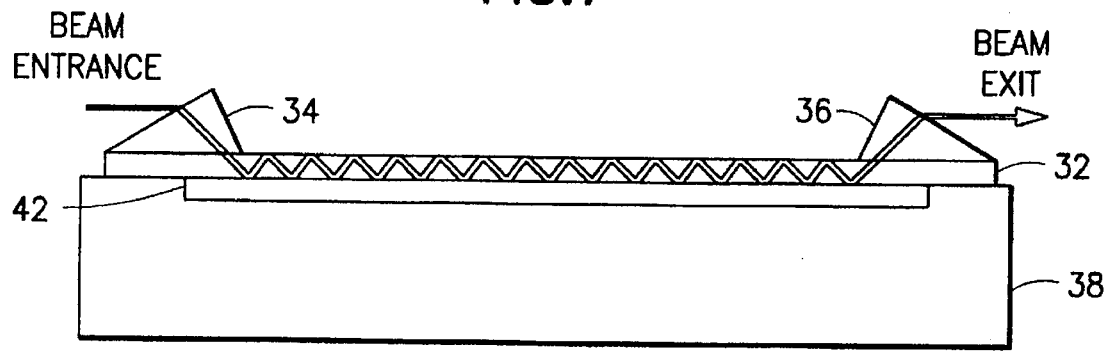
FIG. 8 is a schematic illustration of a single plate TIR-QPM structure using prism coupling.
Figure 9:
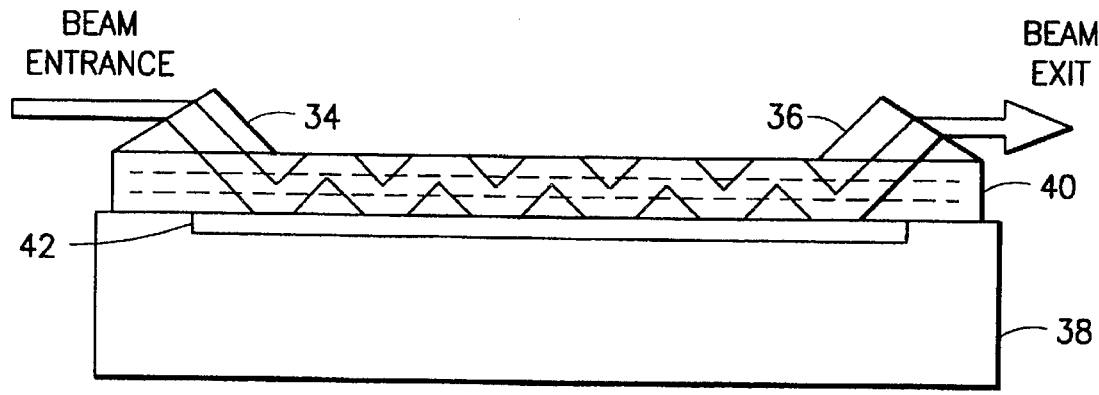
FIG. 9 is a schematic illustration of a three plate slab TIR-QPM structure with prism coupling.

A conceptual design of a device that incorporates the principle of TIR-QPM is shown in FIG. 8 for a slab 32 constructed from a single parallel plate and mounted on a mechanical support base structure 38. The plate is polished to a high-quality optical surface finish, and coupling prisms 34 and 36 are attached to the ends of the slab for beam entry and exit. FIG. 9 shows an example of an embodiment of a slab 40 with three plates that are contacted together. The number of plates may range from two to about five, depending on the crystal properties and beam size. The base structure 38 provides mechanical support for the thin slab 40. The base structure 38 can also dissipate heat generated by the TIR-QPM slab at high average power levels. In FIGS. 8 and 9, a narrow strip of thin air-gap 42 between the slab and the base structure 38 underneath the zig-zag beam path assures TIR bounces in the slab.

The TIR-QPM plates can be fabricated from crystals that have the zinc blende structure with 43 m symmetry. This group includes gallium arsenide (GaAs), zinc selenide (ZnSe), gallium phosphide (GAP), indium antimonide (InSb), indium arsenide (InAs), indium phosphide (InP), zinc sulphide ($\beta$-ZnS), and cadmium telluride (CdTe) crystals. Crystals with optical birefringence or a different crystal symmetry can also be considered for TIR-QPM, especially if a crystal has insufficient birefringence to achieve bulk phase matching but exhibits a large value of nonlinear coefficient under TIR-QPM conditions.

The plate thickness is designed to yield a zig-zag path length L that is approximately an odd integer multiple of the coherence length. For infrared radiation, the coherence length ranges from tens of microns to about 100 µm. For example, $L_c$ for frequency doubling of 10 µm radiation in GaAs is approximately 100 µm. Thus, a minimum plate thickness is on the order of 100–300 µm.

Methods of contacting highly polished plates are well known to those skilled in the art of optical device fabrication. In particular, optical contacting provides an essentially seamless interface between two plates when appropriate preparation is exercised. Such a technique is a preferred method of constructing the present invention, since the use of any adhesives or cements may introduce deleterious effects such as optical absorption, distortion, phase shifts, and laser induced damage.

Figure 10:
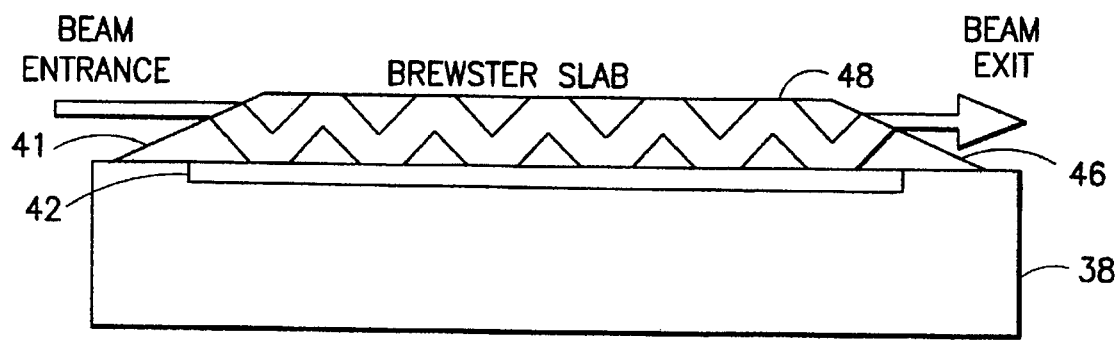
FIG. 10 is a schematic illustration of a TIR-QPM structure with coupling prisms formed directly at each end.

Techniques for inserting an external laser beam into a TIR plate include prism coupling 34, as shown in FIGS. 8, 9 and 10, and diffraction coupling. The prism coupling can be designed to work at the Brewster angle to minimize Fresnel reflection losses for a laser polarization vector in the plane of the zig-zag path. This corresponds to the p3-p2-p1 interaction for TIR-QPM. In this case, the crystal orientation is selected to yield no sign reversal of the d coefficient upon TIR bounce. The Brewster angle prism coupling is especially attractive since broadband anti-reflection coatings are not needed.

A variation of prism coupling, shown in FIG. 10, uses prisms 44 and 46 formed directly onto the plate 48 at each end. In this configuration, the ends of the plate 48 are cut at a certain angle and polished to achieve high optical quality surfaces. This monolithic design may be preferred for some materials for which it is more difficult to fabricate discrete prisms with the surface quality required for optical contacting.

Diffraction coupling is an alternative method of modifying the TIR interface to let part of the incident beam enter or exit the slab in place of the prisms. A series of parallel grooves etched on the plate surface at each end of the slab creates a diffraction grating. An advantage of this scheme is that coupling can be fabricated directly onto the plate. However, this method may not be the preferred choice where diffraction efficiencies are not adequate or angular dispersion is not acceptable for a particular application. While preferred embodiments of the invention have been disclosed in detail, it should be understood by those skilled in the art that various other modifications may be made to the illustrated embodiment without departing from the scope of the invention as described in the specification and defined in the appended claims.

What I claim is:

1. An optical wavelength converter apparatus for converting electromagnetic radiation wavelength comprising:

a body of non-linear optical material having upper and lower parallel surfaces for propagating electromagnetic beams having a given wavelength in said body of optical material by total internal reflection of said electromagnetic beams from said upper and lower parallel surfaces, said upper and lower parallel surfaces being spaced apart by a minimum distance on the order of 100–300 µm, a first optical coupling means for coupling an electromagnetic input beam into said body of optical material at a selected angle relative to said parallel surfaces to produce total internal reflection of said electromagnetic input beam as said input beam propagates within said body of optical material in a zig-zag path wherein a phase-mismatch occurs caused by parametric interaction due to dispersion in said optical material and wherein said electromagnetic input beam is phase-shifted as it propagates in said body of optical material, said phase-shift of said electromagnetic input beam being selected to compensate for said phase-mismatch.

2. An optical wavelength converter apparatus according to claim 1 wherein said first optical coupling means is a prism connected to one of said parallel surfaces of said body of non-linear optical material for coupling an electromagnetic beam into said body of optical material at an angle relative to said one of said parallel surfaces to cause total internal reflection of said electromagnetic beam to occur as said electromagnetic beam propagates and is reflected from said upper and lower parallel surfaces of said body of optical material.

3. An optical wavelength converter apparatus according to claim 1, further including a second optical coupling means for coupling said electromagnetic beam out of said body of optical material and, wherein said first and second optical coupling means are polished surfaces respectively disposed at an angle at each end of an optical plate connected to one of said parallel surfaces of said non-linear optical material.

4. An optical wavelength converter apparatus according to claim 1 wherein said body of non-linear optical material is composed of a plurality of separate optical layers disposed in a stacked configuration having a minimum height on the order of 100 µm–300 µm.

5. An optical wavelength converter apparatus according to claim 1 further including at least one laser device for producing said electromagnetic input beam.

6. An optical wavelength converter apparatus according to claim 5 including a first laser device for providing a first, high-power pump electromagnetic beam at a frequency $\omega_3$ a second laser device for providing a second, low-power seed beam at a signal frequency $\omega_2$, and means for combining said pump beam and said seed beam into a colinear electromagnetic input beam to said first optical coupling means.

7. An optical wavelength converter apparatus according to claim 6 wherein said colinear pump and seed beams parametrically interact in said body of non-linear optical material to generate idler radiation at a frequency $\omega_1$.

8. An optical wavelength converter apparatus according to claim 7 and wherein parametric interaction of said pump and seed beams in said body of non-linear optical material amplifies said signal seed radiation and wherein the sum of said signal and idler frequencies $\omega_1$ and $\omega_2$ equals the pump frequency $\omega_3$ to provide an output beam consisting of amplified signal and generated idler radiation and residual unconverted pump radiation.

9. An optical wavelength converter apparatus according to claim 1 wherein said given wavelength is at least 2 microns and said upper and lower parallel surfaces are spaced apart by a minimum height on the order of 100–300 microns.

* * * * *